(12) United States Patent
Maier et al.

(10) Patent No.: US 7,765,696 B2
(45) Date of Patent: Aug. 3, 2010

(54) PISTON FOR AN INTERNAL COMBUSTION ENGINE AND METHOD FOR COATING ITS PIN BORES

(75) Inventors: Kurt Maier, Leonberg (DE); Reinhard Rose, Fellbach/Schmiden (DE); Gunar Nagel, Waiblingen (DE)

(73) Assignee: Mahle International GmbH, Stuttgart (DE)

( * ) Notice: Subject to any disclaimer, the term of this patent is extended or adjusted under 35 U.S.C. 154(b) by 442 days.

(21) Appl. No.: 11/792,836

(22) PCT Filed: Dec. 9, 2005

(86) PCT No.: PCT/DE2005/002229

§ 371 (c)(1),
(2), (4) Date: Sep. 24, 2007

(87) PCT Pub. No.: WO2006/061013

PCT Pub. Date: Jun. 15, 2006

(65) Prior Publication Data

US 2008/0223211 A1  Sep. 18, 2008

(30) Foreign Application Priority Data

Dec. 10, 2004 (DE) ........................ 10 2004 059 492
Nov. 17, 2005 (DE) ........................ 10 2005 055 365

(51) Int. Cl.
B23P 15/10 (2006.01)
F01B 31/10 (2006.01)

(52) U.S. Cl. ................................ 29/888.048; 92/155

(58) Field of Classification Search ................ 92/155, 92/187, 223; 29/888.048; 427/427.3, 484
See application file for complete search history.

(56) References Cited

U.S. PATENT DOCUMENTS

| 4,775,555 | A  | * | 10/1988 | Duffy ........................ 118/308 |
| 5,171,622 | A  |   | 12/1992 | Wegner |
| 5,239,955 | A  |   | 8/1993  | Rao et al. |
| 6,557,457 | B1 | * | 5/2003  | Hart et al. ..................... 92/223 |
| 6,568,918 | B2 | * | 5/2003  | Sugioka et al. ............... 92/155 |
| 2004/0221715 | A1 | * | 11/2004 | Murase et al. ................. 92/70 |

FOREIGN PATENT DOCUMENTS

| DE | 33 01 366 A1 | 7/1984 |
| DE | 39 39 704 A1 | 6/1991 |
| DE | 41 11 368 A1 | 1/1992 |
| EP | 0 400 334 A2 | 12/1990 |
| EP | 0 713 962 A2 | 5/1996 |
| EP | 1 433 838 A1 | 6/2004 |

OTHER PUBLICATIONS

International Search Report.

* cited by examiner

*Primary Examiner*—Michael Leslie
(74) *Attorney, Agent, or Firm*—Collard & Roe, P.C.

(57) ABSTRACT

Disclosed is a piston (1) for a combustion engine, comprising hub bores (3) that are provided with plain bearing surfaces (5) and are used for accommodating a piston pin. In order to very effectively and inexpensively prevent the piston pin and the hub bores from jamming and wearing off, a self-lubricating coating (6) made of a thermally cured resin which contains embedded solid lubricant particles is applied directly to at least one subarea (Tb) of the plain bearing surfaces by means of rotary atomization.

8 Claims, 2 Drawing Sheets

Figure 4:
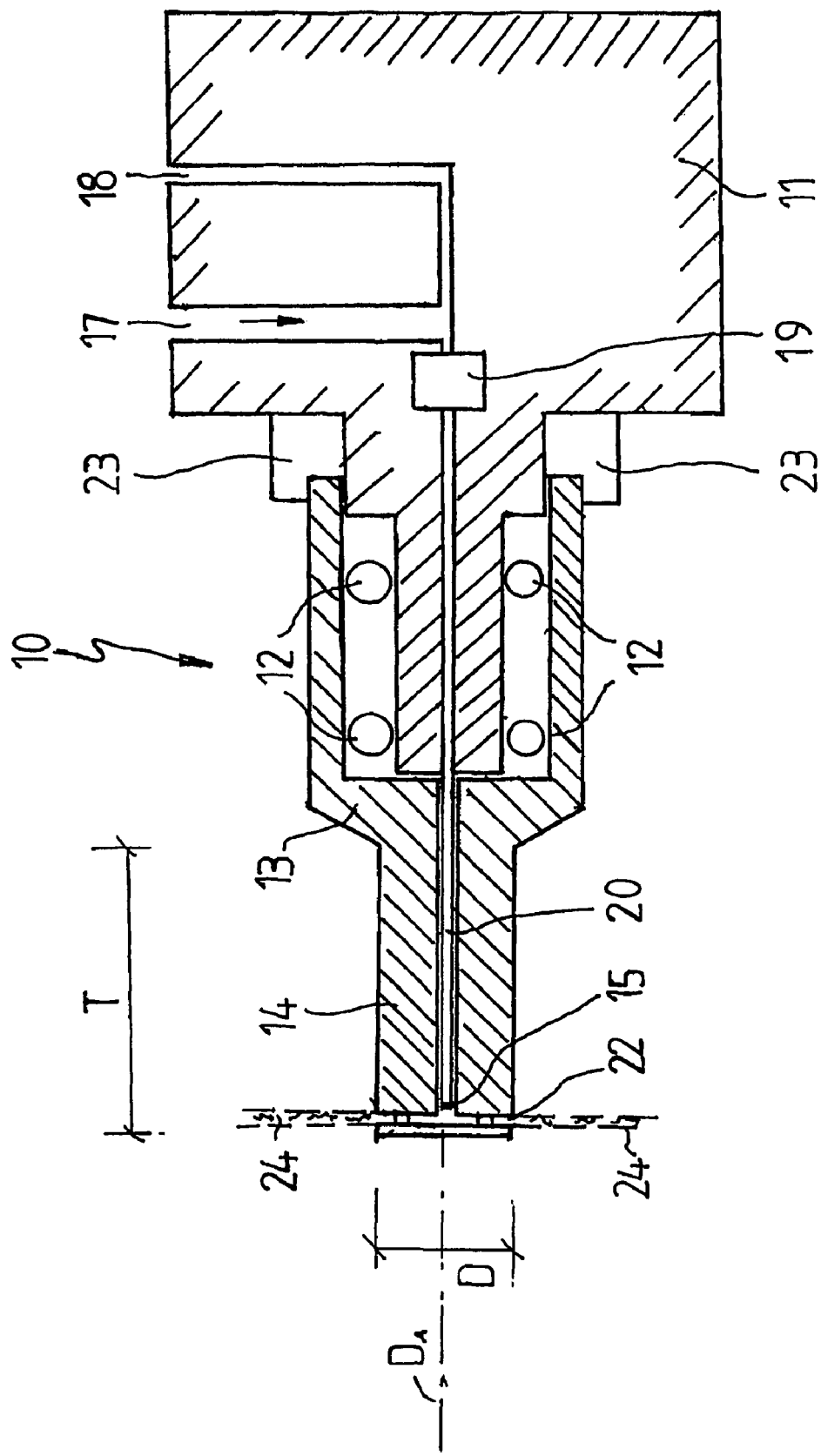

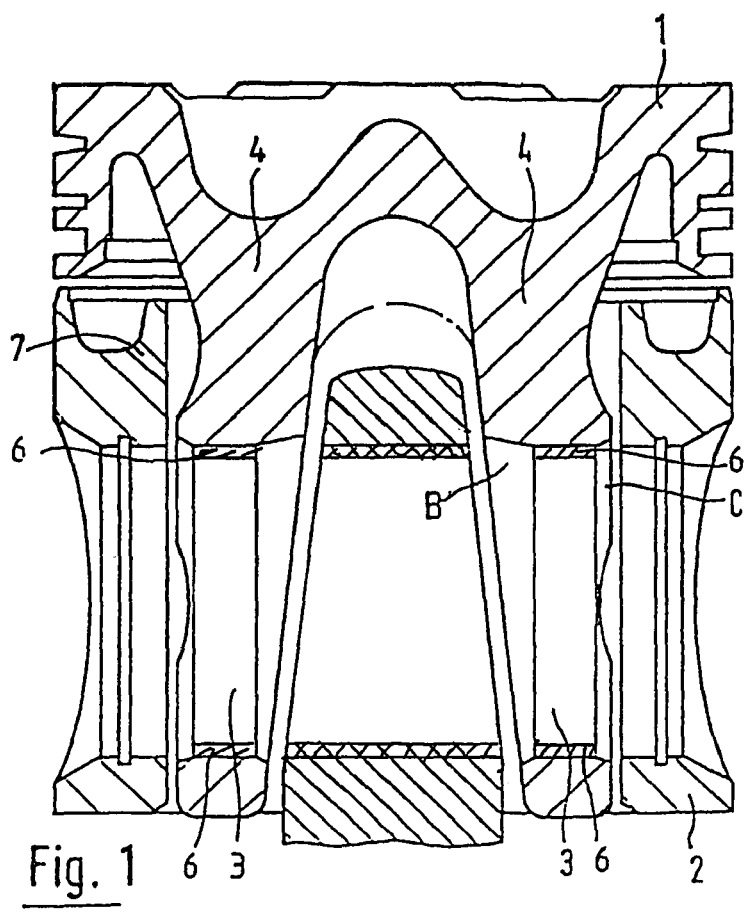
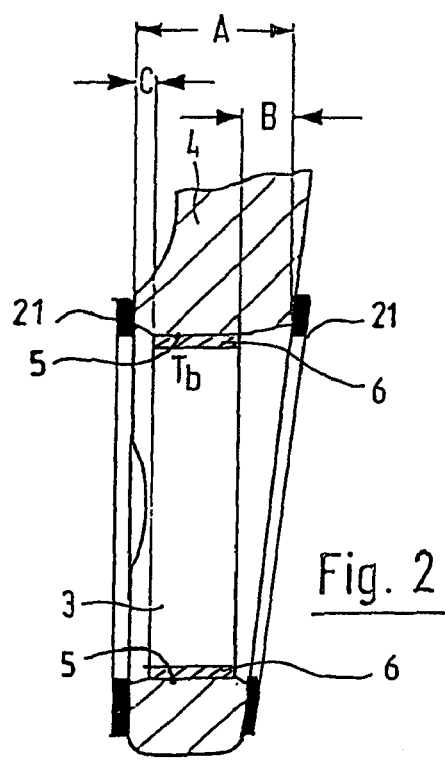
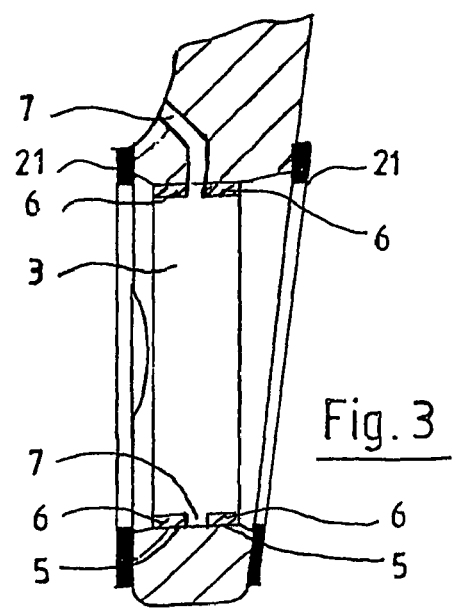
Fig. 1
Fig. 2
Fig. 3

PISTON FOR AN INTERNAL COMBUSTION ENGINE AND METHOD FOR COATING ITS PIN BORES

CROSS REFERENCE TO RELATED APPLICATIONS

Applicants claim priority under 35 U.S.C. §119 of German Application No. 10 2004 059 492.9 filed Dec. 10, 2004, and German Application No. 10 2005 055 365.6 filed Nov. 17, 2005. Applicants also claim priority under 35 U.S.C. §365 of PCT/DE2005/002229 filed Dec. 9, 2005. The international application under PCT article21(2) was not published in English.

The invention relates to a piston for an internal combustion engine, having pin bores having slide bearing surfaces, for accommodating a piston pin.

Pistons having a direct coating of the slide bearing surfaces of their pin bores are known in the prior art, for example from DE 41 11 368 C2 as well as DE 33 01 366 A1. It is disclosed that for the slide bearing surfaces of the pin bores, in a version without a liner, a bearing layer of metal, particularly of nickel, is directly applied to the slide surfaces, at least in part, galvanically, which layer is supposed to assure sufficient lubrication of the bearing points. Furthermore, in the case of an upper piston part made of steel or iron, it is known that the slide bearing surfaces are phosphatized at a surface roughness of Ra (average roughness value) of 0.5 to 2.0 µm, whereby the pin bores are configured as molded bores. In both embodiments, the piston pin is not coated.

In order to adhere to the dimensional accuracy for assembly of the pin into the piston, however, mechanical finishing, for example by means of honing or precision spindling of the metal layer generally continues to be necessary, and this does not permit a clear reduction in the production effort for such piston pin boss coatings. In practice, it has furthermore been shown that the metal layers cannot assure sufficient protection against seizing and reliable lubrication, because of the wear in the bearings, so that the useful lifetime of the pin/pin boss bearings in such embodiments is limited.

Finishing of the coating furthermore requires a great effort in terms of dimensional accuracy, in order to guarantee assembly even with the closest play of piston and piston pin, which permits minimal noise development.

In order to improve the friction property, i.e. slide property of a component, a layer material is known from DE 39 39 704 A1, which material is supposed to produce an irregular, spot-like distribution of varying thickness on the component surface after having been sprayed on. In this connection, the regions having increased thickness are preferably formed by filler particles that are mixed into the layer material. However, it is a disadvantage in this connection that an uncontrolled, non-uniform layer thickness reduction is produced by a firing process for drying, and therefore a precise bearing play adjustment between piston pin and piston pin boss of an internal combustion engine is not guaranteed.

It is therefore the task of the invention to indicate a piston for an internal combustion engine and a method for coating its slide bearing surfaces with which long-term protection against seizing and wear can be achieved, even with very close assembly play, in highly effective and cost-advantageous manner.

According to the invention, this task is accomplished by means of the characteristics of the independent claims 1 and 5.

By means of the direct application of a self-lubricating coating configured as a lubricating varnish, which consists of a resin that can be hardened thermally, with solid lubricant particles embedded in it, onto the slide bearing surfaces of the pin bores of a piston, essentially the following advantages are achieved:

- no bearing liners are required, in order to achieve sufficient lubrication and resistance to seizing;
- application of an adhesion layer to the slide bearing surfaces, in order to improve the adhesion of the lubricating varnish, is not necessary;
- no finishing of the surface of the lubricating varnish that has been applied is required, in order to achieve a desired dimensional accuracy, such as the layer thickness of the coating, the adjustment of the bearing play, etc., as well as the surface quality, such as roughness, waviness, etc.;
- improved resistance is achieved as the result of improved lubricant properties, as compared with the known metal alloy layers, and thereby a greater useful lifetime of the piston/pin bearing is achieved.

Depending on the requirements, the embedded solid lubricant particles can consist of one or of a mixture of two of the materials graphite, molybdenum disulfide, tungsten disulfide, hexagonal boron nitride, or PTFE, whereby the hardened coating of the slide bearing surface contains 50 to 60 wt.-% of the solid lubricant particles, in order to guarantee optimal lubrication of the piston pin/pin boss bearing. For this purpose, the solid lubricant particles have a particle size of 1 to 3 µm at a layer thickness of the hardened lubricating varnish of 10-15 µm. In this connection, the layer thickness tolerance is max. plus/minus 1 µm, making it possible to achieve the closest assembly play.

In terms of method, the lubricating varnish is advantageously applied to the slide bearing surfaces of the pin bores by means of a rotation atomization method, thereby making it possible to achieve a coating of pin bores even if they have a smaller diameter.

The layers produced in this manner have a uniform layer thickness and a very good surface quality. Likewise, the depth of the region to be coated can be defined very well. The coating method is very economical as compared with the usual types of coatings.

Advantageous further developments are evident from the dependent claims.

Exemplary embodiments of the invention will be described in greater detail below, using the attached drawings. These show:

FIG. 1 a section through a piston having a piston skirt articulated on by way of the piston pin;

FIG. 2 a pin bore region as a detail from the piston according to FIG. 1;

FIG. 3 a pin bore region having a lubricating bore as a detail according to FIG. 2;

FIG. 4 a device for applying a coating to the slide bearing surfaces of a pin bore.

The piston 1 shown as an example according to FIG. 1—which can also be a Ferrotherm® piston or Monotherm® piston from the company MAHLE in Stuttgart, made of steel, or a steel upper piston part or can be, in general, a light-metal piston—has pin bosses 4 having pin bores 3 provided with a slide bearing surface 5, which bores, depending on the requirements, are mold-bored and/or configured in high oval or crosswise oval shape. The surface roughness Ra (average roughness value) can correspond to that indicated in DE 41 11 368 A1, whereby in general, the Ra values amount to 0.63 µm for pin bore diameters less than 30 mm, and Ra values of 0.8 µm are achieved for pin bore diameters between 30-60 mm. The pin bores 3 having the length A can be cylindrical and circular or cylindrical with a slight ovality, and can be configured with or without widened bore end regions B, C.

The slide bearing surfaces 5 show a self-lubricating coating 6 that is formed from a resin that is hardened thermally, with the solid lubricant particles embedded in it—referred to as a lubricating varnish. The resin is a polyamide imide and the solid lubricant particles consist of one or a mixture of two of the materials graphite, molybdenum disulfide, tungsten disulfide, hexagonal boron nitride, or PTFE.

A device 10 for rotation atomization serves to apply the coating according to the invention to the slide bearing surfaces 5 of the pin bosses 4. The device 10 has a basic body 11 that makes a transition into a nozzle body 13 that can rotate, which is provided with a bearing 12, a nozzle 14, as well as a nozzle exit 15. A drive 23 serves to rotate the nozzle body 13. The basic body 11 possesses feed channels 17 and 18, in each instance, which are intended for the lubricating varnish and for compressed air, and end in a mixing chamber 19 for metering and mixing. An ejection channel 20 connected with the mixing chamber 19 leads vertically to a baffle plate 16, which is disposed at a distance from the nozzle body 13, in order to produce a ring-shaped gap 22 having a width of 0.5 mm for ejection of the lubricating varnish spray jet 24.

The nozzle body 13 with its nozzle 14 rotates, by means of the drive 23, in the rpm range of 14,000 to 18,000 rotations per minute, so that the lubricating varnish/compressed air mixture is accelerated by the centrifugal forces that occur at the exit opening of the ring-shaped gap, and exits radially as a disk-shaped spray jet 24. In this connection, the nozzle diameter D is selected in such a manner that it approximately corresponds to half the diameter of the pin bore diameter of the slide bearing surface to be coated. The device can be moved into the connecting rod end to be coated, up to the nozzle depth T. Since the spray jet is narrow in the axis direction, the surface to be coated can be sharply delimited, in the axis direction, by means of simply opening and closing the varnish feed. The nozzle diameters are available in the range between 5 and 25 mm, with nozzle depths up to 50 mm, so that pin bores for pistons of all engine types can be coated with the device.

EXEMPLARY EMBODIMENT 1

Complete Coating of the Slide Bearing Surface of the Pin Bore:

The pin bore 3 is mechanically finished in known manner, and has one of the aforementioned surface roughness values, depending on its diameter. In this connection, the pin bore diameter before coating is selected in such a manner that the piston pin is given a diametral play of 30-40 µm. The piston, with its pin bosses, is cleaned in such a manner that chips, particles, machining oils, and the like are completely removed.

In order to prepare the coating, cover templates 21 are affixed on both sides of the pin bores 3, which templates are adapted to the outside contour of the pin bosses 4. The templates 21 prevent coating the outsides of the pin bosses.

The lubricating varnish, which is composed of the base resin polyamide imide, which is very temperature-resistant, contains a mixture of molybdenum sulfide and graphite having a particle size of 1-3 µm as the solid lubricant. The viscosity of the lubricating varnish is adjusted in such a manner that no drop formation is possible, but sufficient application is possible.

The nozzle is introduced into the pin bore 3 in centered manner, at an advance of 10-20 mm/sec, so that the lubricating varnish is applied to the piston, which has been preheated to 50 to 80° C. The lubricating varnish contains 50-60 wt.-% solid lubricants in the hardened state. The nozzle is subsequently retracted without feeding in any varnish. The entire coating process takes place in less than five seconds.

Afterwards, the layer is thermally hardened in an oven, whereby the piston must be held at a temperature of 200° C. for between 10 and 20 minutes. The layer obtained in this manner is approximately 10 µm thick, whereby a layer thickness tolerance of plus/minus 1 µm is achieved. Despite a thickness reduction of the slide layer as the result of shrinking of the layer, a close diametral pin play is achieved, which amounts to 10-20 µm.

EXEMPLARY EMBODIMENT 2

Partial Coating of the Slide Bearing Surface of the Pin Bore:

The piston is finished and cleaned essentially in accordance with Exemplary embodiment 1.

In order to prepare the coating, cover templates 21 are affixed on both sides of the pin bores 3, which templates are adapted to the outside contour of the pin bosses 4. The templates 21 prevent coating the outsides of the pin bosses.

The lubricating varnish, which is composed of the base resin polyamide imide, which is very temperature-resistant, contains graphite having a particle size of 1-3 µm as the solid lubricant. The viscosity of the lubricating varnish is adjusted in such a manner that no drop formation is possible, but sufficient application is possible.

The cylindrical region of the pin bore is supposed to be coated with the lubricating varnish, whereby the device 11 is used.

The nozzle 14 is set against one pin boss side—moving from left to right in FIG. 3—and moved in, without feeding in lubricating varnish, up to the end of the region C of the pin bore 3, and subsequently, the lubricating varnish is applied until the beginning of the pin boss region B is reached. Afterwards, the varnish feed is shut off, the nozzle is retracted, and the remainder of the varnish remaining in the nozzle is sprayed onto the template. Application of the lubricating varnish takes place onto the piston that has been preheated to 50 to 80° C.

Afterwards, the layer is thermally hardened in an oven, whereby the piston 1 must be held at a temperature of 200° C. for between 10 and 20 minutes. The layer obtained in this manner is approximately 10 µm thick, whereby a layer thickness tolerance of plus/minus 1 µm is achieved. Despite a thickness reduction of the slide layer as the result of shrinking of the layer, a close diametral pin play is achieved, which amounts to 10-20 µm. This play is particularly advantageous for avoiding noise caused by pin ticks. The coating guarantees that no seizing takes place despite the close play.

EXEMPLARY EMBODIMENT 3

Coating of the Slide Bearing Surfaces of the Pin Bore with Lubricant Groove Left Out:

The piston is finished and cleaned essentially in accordance with Exemplary embodiment 1. Additional bores 7 for a lubricant oil supply to the piston pin, which is not shown in FIG. 1, are made in the pin bosses 4, in known manner.

In order to prepare the coating, cover templates 21 are affixed on both sides of the pin bores, which templates are adapted to the outside contour of the pin bosses 4. The templates 21 prevent coating the outsides of the pin bosses.

The lubricating varnish, which is composed of the base resin polyamide imide, which is very temperature-resistant, contains graphite having a particle size of 1-3 µm as the solid lubricant. The viscosity of the lubricating varnish is adjusted in such a manner that no drop formation is possible, but sufficient application is possible.

The lubricant oil bores 7 made in the center of the pin bores 3 are not supposed to be closed off by the lubricating varnish. For this reason, and so that the lubricant oil can better distribute itself in the gap between pin bore and piston pin, the coating 6 is left out in the region of the lubricant oil bore, in the form of a circumferential "lubricant groove" that runs radially, in accordance with the representation of FIG. 3. Likewise, one or more lubricant grooves that run parallel to the axis of the pin bores, or also a combination thereof, can be implemented by means of the use of appropriate masks. The device 11 is used for coating.

The nozzle 14 is set against one pin boss side K1 and moved in, without feeding in lubricating varnish, up to the depth T1 of the pin bore 3. Subsequently, the lubricating varnish is applied in the region d. In the region of the cover template 21, on the piston side K2, the varnish feed is shut off, and the rest of the varnish remaining in the nozzle 14 is sprayed onto the template 21. Subsequently, the nozzle 14 is moved back up to the depth T2, without feeding varnish, and from there the region e is sprayed with lubricant varnish. The remainder of the lubricating varnish is sprayed onto the piston side K1, in the region of the cover template 21. Application of the lubricating varnish takes place onto the piston that has been preheated to 50 to 80° C.

Afterwards, the layer is thermally hardened in an oven, whereby the piston must be held at a temperature of 200° C. for between 10 and 20 minutes. The layer obtained in this manner is approximately 10 μm thick, whereby a layer thickness tolerance of plus/minus 1 μm is achieved. Despite a thickness reduction of the slide layer as the result of shrinking of the layer, a close diametral pin play is achieved, which amounts to 10-20 μm. This play is particularly advantageous for avoiding noise caused by pin ticks. The coating guarantees that no seizing takes place despite the close play.

EXEMPLARY EMBODIMENT 4

Eccentric Coating of the Slide Bearing Surfaces of the Pin Bore:

The piston is finished and cleaned essentially in accordance with Exemplary embodiment 1.

In order to prepare the coating, cover templates 21 are affixed on both sides of the pin bores 3, which templates are adapted to the outside contour of the pin bosses 4. The templates 21 prevent coating the outsides of the pin bosses.

The lubricating varnish, which is composed of the base resin polyamide imide, which is very temperature-resistant, contains graphite having a particle size of 1-3 μm as the solid lubricant. The viscosity of the lubricating varnish is adjusted in such a manner that no drop formation is possible, but sufficient application is possible.

At an advance of 10-20 mm/sec, the nozzle 14 is eccentrically introduced into the pin bore 3. The eccentricity amounts to one-fourth of the nozzle diameter D, whereby the axis of the nozzle is displaced in the direction of the pin bore zenith. The lubricating varnish is applied onto the piston that has been preheated to 50 to 80° C. The lubricating varnish contains 50-60 wt.-% solid lubricants in the hardened state. The nozzle is subsequently retracted without feeding in any varnish. The entire coating process takes place in less than five seconds.

Afterwards, the layer is thermally hardened in an oven, whereby the piston must be held at a temperature of 200° C. for between 10 and 20 minutes. The layer 6 obtained in this manner has a thickness of approximately 15 μm in the direction of the pin bore zenith, and a thickness of approximately 5 μm in the direction of the pin bore nadir. At the equator of the pin bore, the coating thickness is approximately 10 μm. With this, a thicker layer is applied in the region of the greatest mechanical stress, while a thin layer is applied in the region of the least mechanical stress.

A centrifuge apparatus S-520 from the Sprimag company in Kirchheim is suitable for carrying out the coating method. The coating indicated can also be applied to slide bearing surfaces of the pin bores 3 that have already been phosphatized, whereby the layer thickness of phosphate layer and coating 7 must be coordinated with the installation play of the piston pin/pin boss bearing, in each instance. In this connection, the piston pin is not coated.

It lies within the scope of the invention that the coating can also be used for pistons having pin boss liners. The working surface of the liner can be coated in the manner indicated.

REFERENCE SYMBOLS 1 piston
2 piston skirt part
3 pin bore
4 pin bosses
5 slide bearing surface of the pin bores
6 coating, self-lubricating (lubricating varnish)
7 lubricant oil bore/lubricant oil groove
10 device for rotation atomization
11 basic body
12 bearing for nozzle body
13 nozzle body
14 nozzle
15 nozzle exit
16 baffle plate
17 feed channel for lubricating varnish
18 feed channel for compressed air
19 mixing chamber
20 ejection channel
21 template
22 gap
23 drive
24 spray jet
D nozzle diameter
T nozzle depth
Da nozzle axis

The invention claimed is:

1. Method for coating slide bearing surfaces of a pin bore comprising the steps of:
   directly applying a self-lubricating coating consisting of a thermally hardened resin with solid lubricant particles embedded in it to the slide bearing surfaces by means of rotation atomization, wherein the rotation atomization is carried out by a rotating nozzle centrally introduced into the pin bore, at an advance of 10-20 mm/sec.

2. Method according to claim 1, wherein the resin is a polyamide imide, wherein each of the solid lubricant particles are formed by one or by a mixture of two of the materials graphite, molybdenum disulfide, tungsten disulfide, hexagonal boron nitride, or PTFE, and wherein the mixture consists of the individual components and the resin is applied to the slide bearing surfaces of the pin bore as a lubricating varnish.

3. Method according to claim 2, wherein the lubricating varnish is applied to completely degreased, cleaned slide bearing surfaces of the piston, free of chips and deposits, having a surface roughness $R_a$ (average roughness value) <0.63 μm.

4. Method according to claim 3, wherein atomization of the lubricating varnish is carried out at a rotation speed of the nozzle of 14,000 to 18,000 rotations per minute.

5. Method according to claim 1, wherein the lubricating varnish is atomized on perpendicular to the slide bearing surface.

6. Method according to claim 4, wherein the piston is preheated before and during the rotation atomization of the lubricating varnish, and the piston is subjected to a heat treatment immediately after completion of the rotation atomization.

7. Method according to claim 5, wherein preheating of the piston takes place until a piston temperature of 50 to 80° C. is reached, whereby the heat treatment is carried out at a temperature of 200° C. between 10 and 20 min.

8. Method according to claim 6, wherein the lubricant varnish is hardened to achieve a layer thickness tolerance of plus/minus 1 μm.

* * * * *